United States Patent
Hoover

(10) Patent No.: US 12,420,804 B2
(45) Date of Patent: Sep. 23, 2025

(54) DRIVER ATTRIBUTE DETECTION SYSTEM AND ASSOCIATED METHOD OF ADJUSTING A VEHICLE FEATURE

(71) Applicant: Honda Motor Co., Ltd., Tokyo (JP)

(72) Inventor: Andrew R. Hoover, West Liberty, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 345 days.

(21) Appl. No.: 18/162,261

(22) Filed: Jan. 31, 2023

(65) Prior Publication Data

US 2024/0253641 A1    Aug. 1, 2024

(51) Int. Cl.
*B60W 40/08*    (2012.01)
*B60R 16/037*    (2006.01)

(52) U.S. Cl.
CPC .......... *B60W 40/08* (2013.01); *B60R 16/037* (2013.01); *B60W 2420/403* (2013.01); *B60W 2540/21* (2020.02); *B60W 2540/221* (2020.02)

(58) Field of Classification Search
CPC ............ B60W 40/08; B60W 2540/21; B60W 2540/221; B60W 2420/403; B60R 16/037
See application file for complete search history.

(56) References Cited

U.S. PATENT DOCUMENTS

| | | | |
|---|---|---|---|
| 7,110,570 B1 | 9/2006 | Berenz et al. | |
| 8,185,380 B2 | 5/2012 | Kameyama | |
| 9,085,269 B2 * | 7/2015 | Abuelsaad | B60R 16/037 |
| 9,545,930 B2 | 1/2017 | Ricci | |
| 9,707,913 B1 * | 7/2017 | Ochiai | B60R 16/037 |
| 9,848,814 B2 | 12/2017 | Benson et al. | |
| 10,793,004 B2 | 10/2020 | Hwang et al. | |
| 10,850,693 B1 * | 12/2020 | Pertsel | G06V 40/103 |
| 11,001,267 B2 * | 5/2021 | Donnelly | A61B 5/7203 |
| 11,059,349 B2 * | 7/2021 | Prakah-Asante | B60H 1/00807 |
| 11,117,534 B2 * | 9/2021 | Coburn | B60R 16/037 |
| 11,453,406 B2 * | 9/2022 | Ahn | B60W 10/20 |
| 2006/0018518 A1 | 1/2006 | Fritzsche et al. | |
| 2011/0224875 A1 * | 9/2011 | Cuddihy | B60W 10/18 701/1 |
| 2012/0053793 A1 * | 3/2012 | Sala | B60N 2/0035 701/45 |
| 2014/0316607 A1 | 10/2014 | Le et al. | |
| 2014/0343796 A1 * | 11/2014 | Abuelsaad | B60R 16/037 701/1 |
| 2018/0251085 A1 * | 9/2018 | Coburn | H04W 4/40 |
| 2019/0332902 A1 | 10/2019 | Gallagher et al. | |
| 2020/0093635 A1 | 3/2020 | Kakizaki et al. | |
| 2024/0249537 A1 * | 7/2024 | Aoki | G06T 7/00 |

FOREIGN PATENT DOCUMENTS

| | | |
|---|---|---|
| CN | 104691461 A | 6/2015 |
| CN | 109455117 A | 3/2019 |
| JP | 6221942 | 11/2017 |

* cited by examiner

*Primary Examiner* — Ramsey Refai
(74) *Attorney, Agent, or Firm* — Plumsea Law Group, LLC

(57) ABSTRACT

A method of adjusting a feature of a vehicle includes receiving a signal from a first sensor of the vehicle, analyzing the signal, detecting an attribute of an occupant of the vehicle based on the analysis of the signal, determining an adjustment based on the attribute of the occupant, and adjusting the feature of the vehicle based on the adjustment determined based on the attribute of the occupant.

12 Claims, 10 Drawing Sheets

DRIVER ATTRIBUTE DETECTION SYSTEM AND ASSOCIATED METHOD OF ADJUSTING A VEHICLE FEATURE

BACKGROUND

1. Field of the Disclosure

The present disclosure relates to an attribute detection system, and more particularly to an attribute detection system in a vehicle.

2. Description of Related Art

In the context of vehicles, driver preferences are typically captured in a limited memory feature, which may be used to adjust a seat position and mirror alignment to a previously stored setting. Other settings may require manual implementation by the driver or passenger upon entering a vehicle.

SUMMARY OF THE INVENTION

The present disclosure is directed to improvements in vehicle feature adjustment. In some examples, a physical attribute of an occupant of the vehicle is detected and the vehicle automatically responds to the detected attribute by adjusting one or more features. Attributes of the occupant, which may be detected at any time, may be used to determine adjustments of vehicle features or system preferences. The detection of attributes may be accomplished by cameras or other sensors. In some cases, the occupant of the vehicle may be presented with an optimal position/adjustment combination and requested to confirm the adjustment before implementation. These attributes and adjustments may be stored as tuples in a vehicle profile, which may be referenced upon the detection of the attribute.

In one aspect, a method of adjusting a feature of a vehicle includes receiving a signal from a first sensor of the vehicle, analyzing the signal, detecting an attribute of an occupant of the vehicle based on the analysis of the signal, determining an adjustment based on the attribute of the occupant, and adjusting the feature of the vehicle based on the adjustment determined based on the attribute of the occupant.

In one or more aspects, a vehicle includes a camera, an electronic control unit connected to the camera, a vehicle system connected to the electronic control unit, and a memory storing an attribute and an associated adjustment to the vehicle system, wherein the electronic control unit includes instructions that when executed detect the attribute in a signal received from the camera.

In some aspects, a method of adjusting a feature of a vehicle comprising an electronic control unit, a vehicle system connected to the electronic control unit, and a memory accessible to the electronic control unit includes receiving, by the electronic control unit, a signal from a first sensor of the vehicle, analyzing, by the electronic control unit, the signal, detecting, by the electronic control unit, an attribute of an occupant of the vehicle based on the analysis of the signal, determining, by the electronic control unit, an adjustment based on the attribute of the occupant using the memory storing a plurality of attributes and corresponding adjustments to the vehicle system, and adjusting, by the electronic control unit, the feature of the vehicle based on the adjustment determined based on the attribute of the occupant.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DETAILED DESCRIPTION

There is a need in the art for a system and method that provides for the detection of physical attributes of a vehicle occupant in connection with adjustments made to vehicle features. These adjustments may be automatic or presented to the occupant as a prompt for action.

Figure 1:
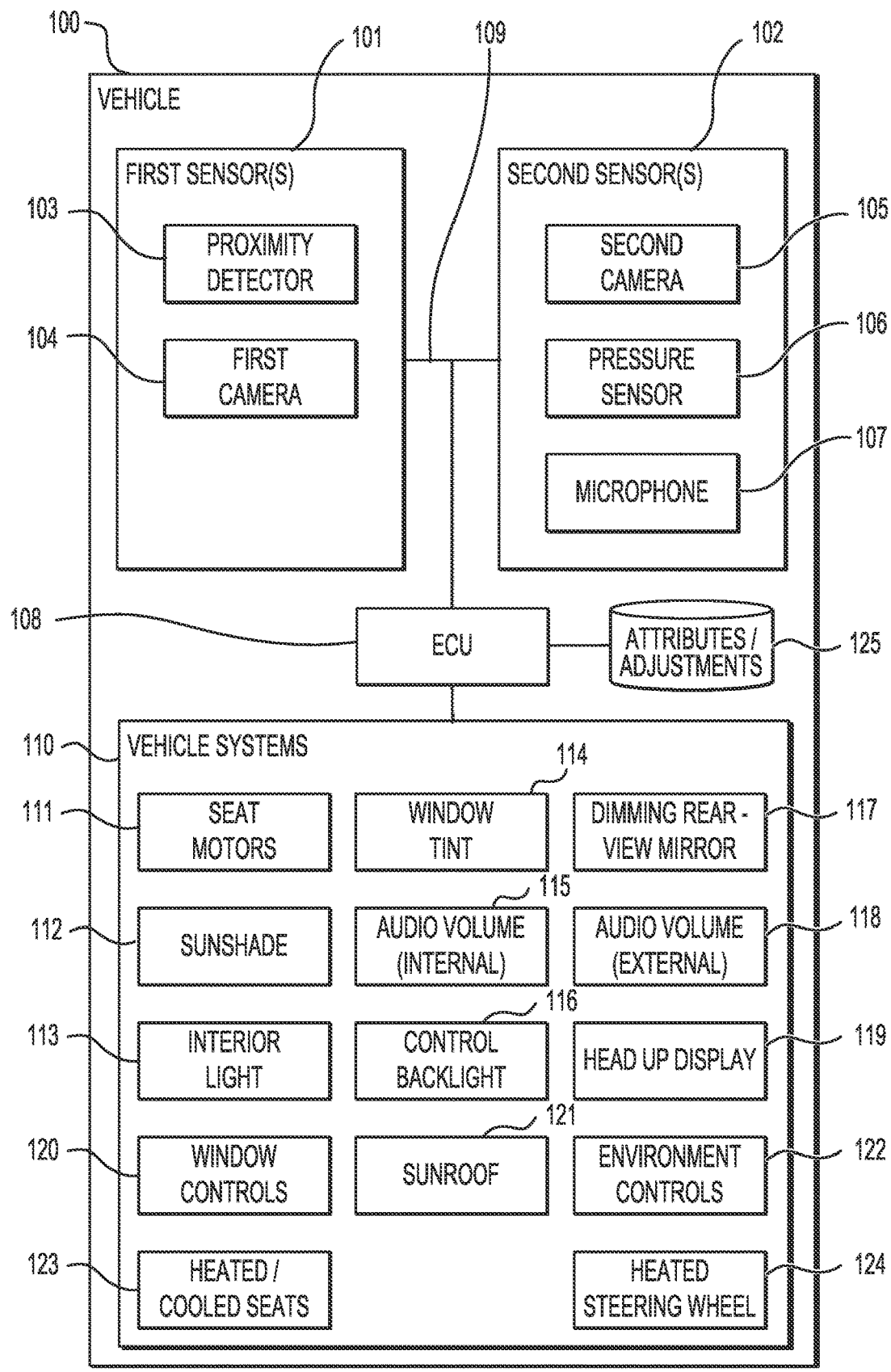
FIG. 1 illustrates an embodiment of a vehicle.

The vehicle may include sensors for detecting the physical attributes of the vehicle occupant. These physical attributes may be limited to a set of attributes of interest, for example, a set of pre-defined attributes. As illustrated in FIG. 1, a vehicle 100 may include first sensors 101 and second sensors 102, which may be connected to an electronic control unit (ECU 108) by a bus 109. The first sensors 101 may detect a person and attributes of the person in an environ around the vehicle. The second sensors 102 may detect attributes of the person as an occupant of the vehicle, that is, once the person has entered the vehicle.

The first sensors 101 may detect first attributes of a person outside of the vehicle. The first sensors 101 may detect first attributes of the person approaching the vehicle. The first sensors 101 may include a proximity detector 103 to detect the approach of the person and a first camera 104 to detect attributes of the person. According to some embodiments, the first sensors 101 may be collect data from an environment outside of the vehicle. The first sensors 101 may communicate signals, including the collected data, to the ECU 108.

Once the person is inside the vehicle, the second sensors 102 may detect second attributes of the person, who is now an occupant of the vehicle. The second sensors 102 may include a second camera 105, a pressure sensor 106, and a microphone 107. According to some embodiments, the second sensors 102 may be collect data from an environment inside of the vehicle. The second sensors 102 may communicate signals, including the collected data, to the ECU 108.

According to some embodiments, the ECU 108 may analyze the signals received from the first sensors 101 and/or the second sensors 102 and determine control signals to control one or more vehicle systems 110 in response to the collected data. Controllable components of the vehicle systems 110 may include, for example, seat motors 111 including, for example, motors for controlling seat position, powered head rests, lumbar adjustments, and side bolsters, a sunshade 112, interior lights 113, controllable window tint 114 such as an electrochromic window film, audio volume within the vehicle 115, backlights of controls and displays 116, a dimming rear view mirror 117, audio volume outside of the vehicle 118, and a head up display 119. Other controllable components are contemplated and can include electric window controls 120, electric sunroof 121, environmental controls 122 including heat and air-conditioning, heated and cooled seats 123, and heated steering wheels 124. The heated and cooled seats 123 and the heated steering wheels 124 may be more generally called thermal devices. The thermal devices may further comprise, for example, window/mirror defrosting elements.

Figure 2:
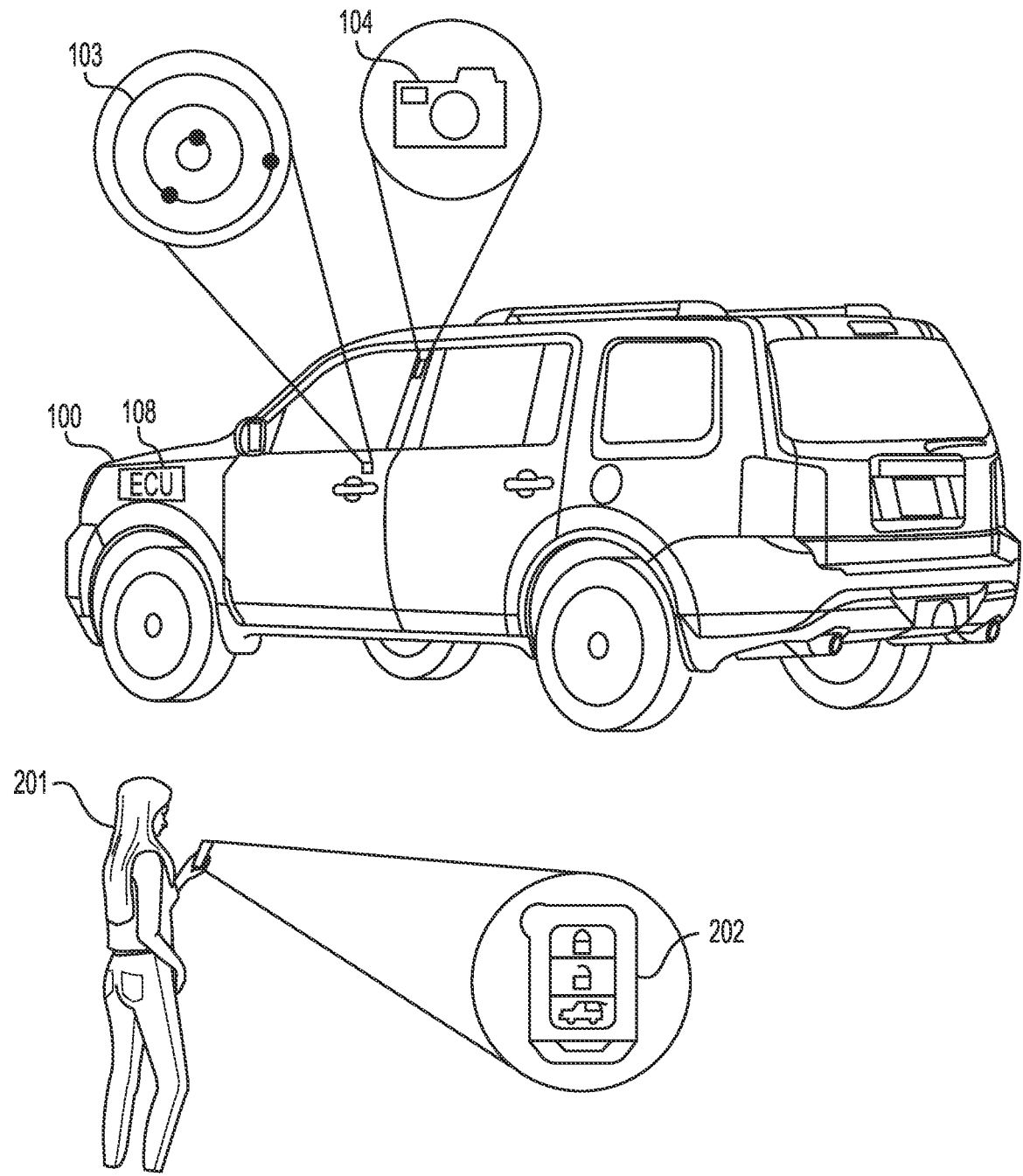
FIG. 2 illustrates an embodiment of a driver approaching a vehicle.

As illustrated in FIG. 2, a person 201 carrying a proximity beacon 202 approaches the vehicle 100 and the proximity detector 103 detects the proximity beacon 202. A detection of the proximity beacon 202 may cause the first camera 104 to capture an image or video of the person. The ECU 108 may perform image analysis on the captured data to detect an attribute of the person.

Figure 3:
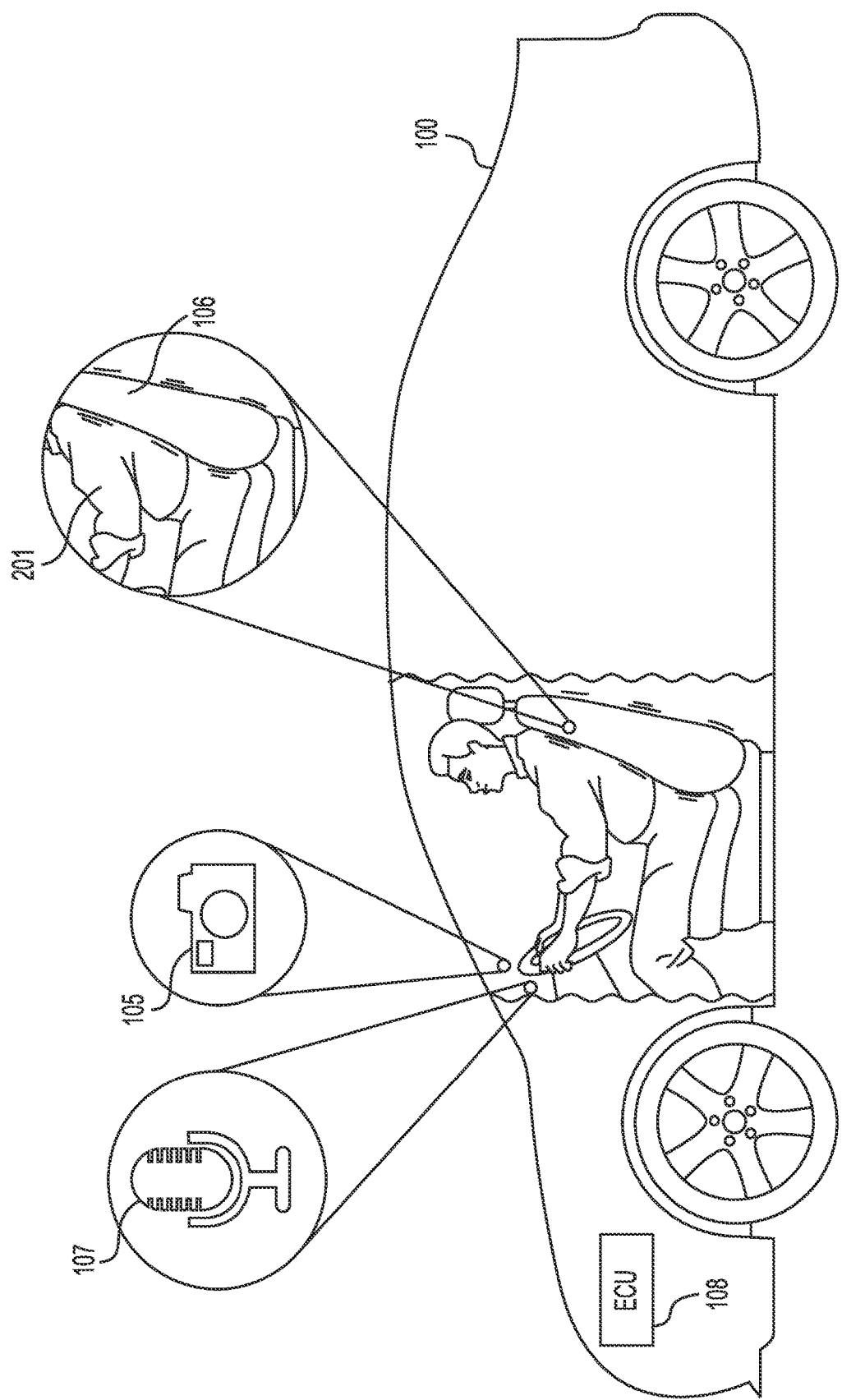
FIG. 3 illustrates an embodiment of a driver seated in a vehicle.

As illustrated in FIG. 3, the system may use one or more of the second sensors 102 to detect an attribute of the occupant 201 of the vehicle. More particularly, the second camera 105 may capture an image or video of the occupant 201. The pressure sensor 106, deployed in a seat, may sense the presence of the occupant 201 in a particular seat of the vehicle. In some examples, the pressure sensor 106 may measure a weight of the occupant 201. The microphone 107 may capture sounds indicative of, for example, certain clothing worn by the occupant 201, such as a thick winter jacket.

Figure 4:
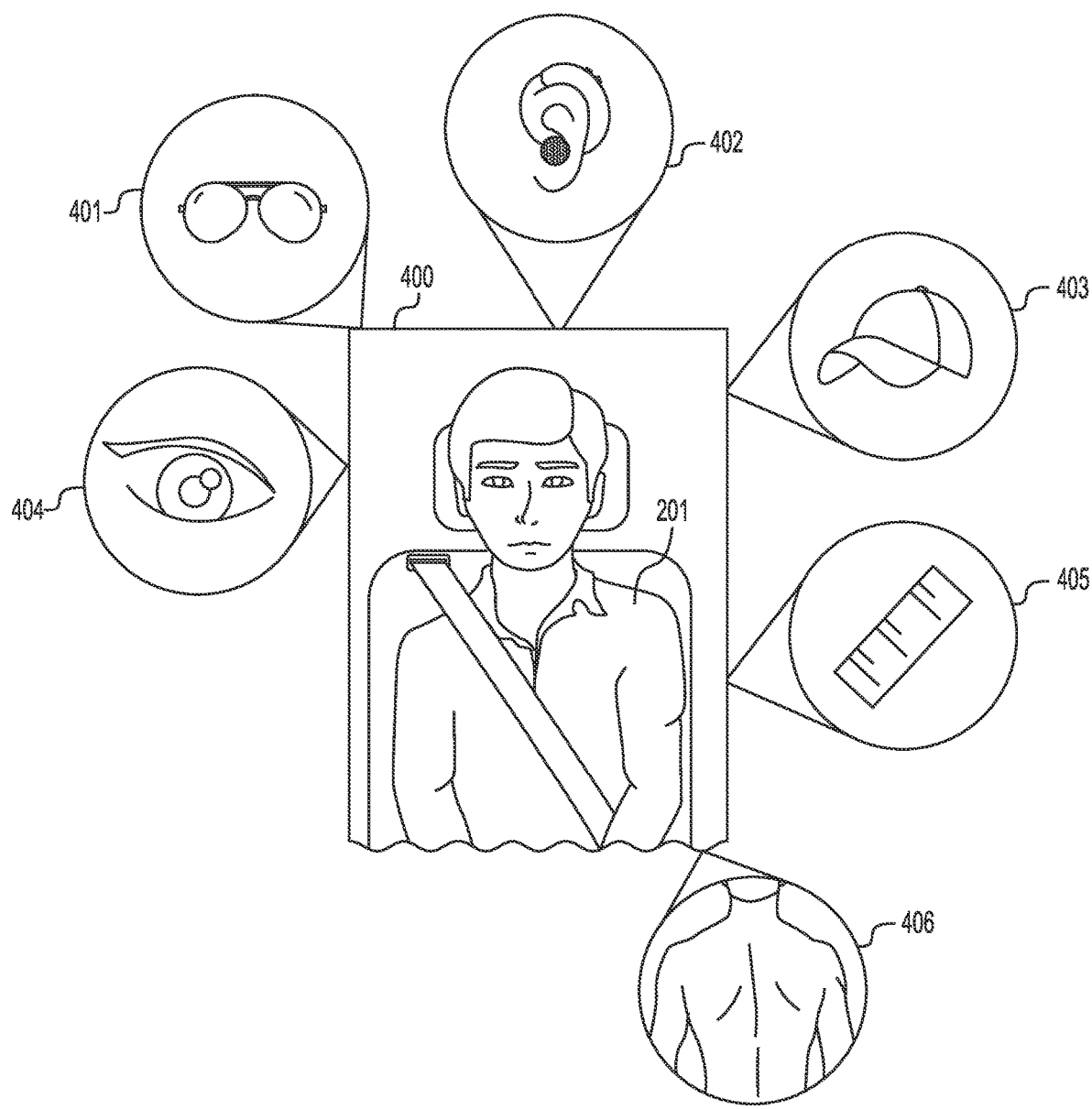
FIG. 4 illustrates an embodiment of attributes of an occupant of a vehicle.

As illustrated in FIG. 4, the sensors may detect one or more attributes of the occupant 201 based on an image 400 of the occupant. The attributes may include, for example, whether the occupant (or person) is wearing sunglasses 401, an audio device 402 such as a hearing aid device, or a hat 403. Other detectable attributes of the occupant 201 may include eye color 404, occupant height 405, and occupant posture 406. Each of these attributes may be detected using the first camera 104 and/or the second camera 105. In addition, other sensors may be used. For example, the pressure sensor 106 may include a plurality of sensors that can detect the pressure at different points on the seat to determine the occupant's current posture 406.

Features of the system have one or more advantages over conventional vehicles in which a driver will manually adjust different components. These manual adjustments may distract the driver from driving and may need to be performed one or more times during the same drive.

Figure 5:
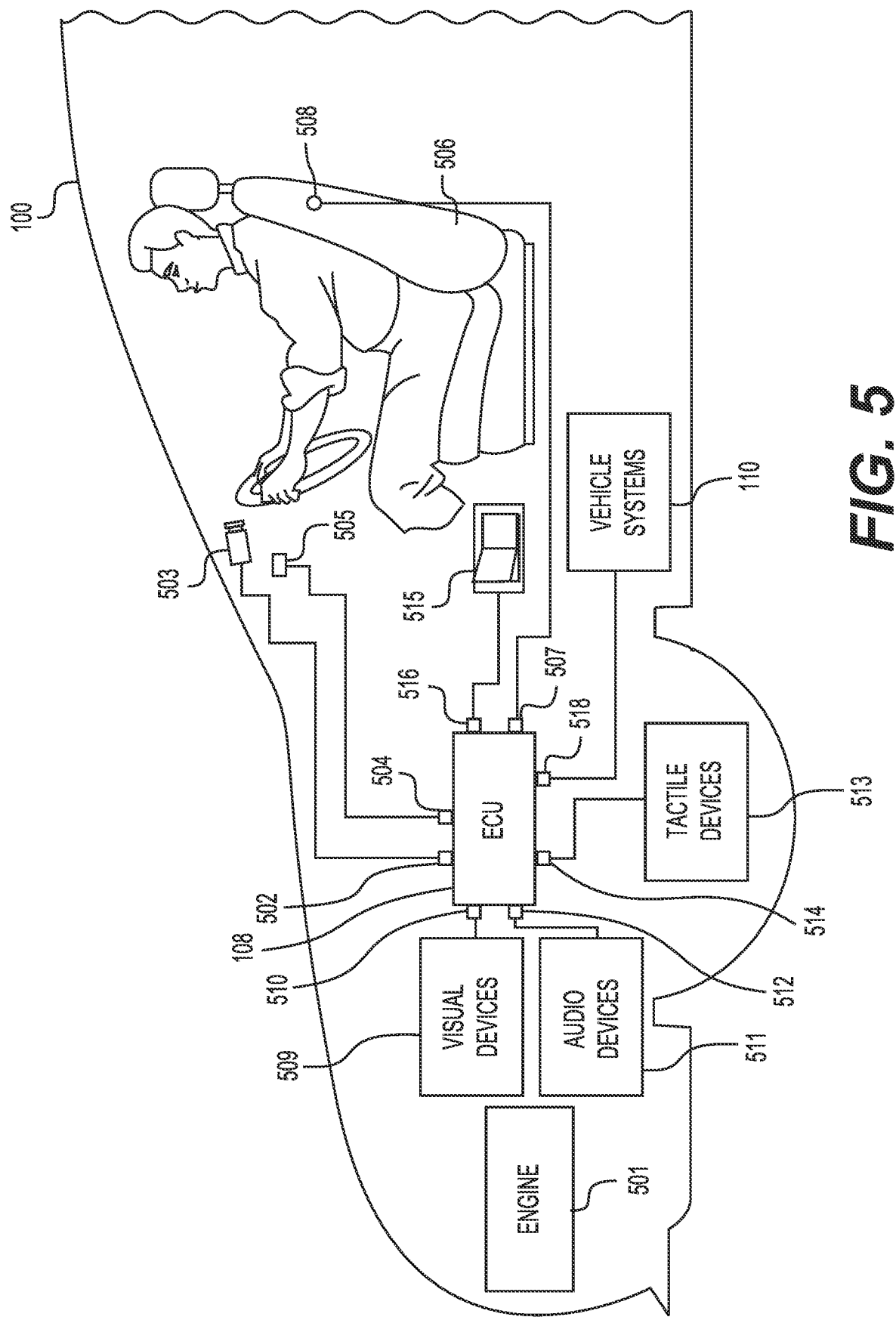
FIG. 5 illustrates an embodiment of an ECU of a vehicle.

As illustrated in FIG. 5, the detected attributes are communicated to the ECU 108 and processed. The ECU 108 may automatically adjust one or more vehicle features based on the detected attributes. In some cases, the ECU 108 may request that the occupant confirm an adjustment before implementation. For example, the ECU 108 may determine that the occupant is wearing sunglasses and prompt the occupant to confirm that an auto-dimming feature of a rear-view mirror 117 may be turned off.

FIG. 5 is a schematic view of an embodiment of various components for the vehicle 100. The term "vehicle" as used throughout this detailed description and in the claims refers to any moving vehicle that is capable of carrying one or more human occupants or riders and is powered by any form of energy. The term "vehicle" includes, but is not limited to cars, trucks, vans, minivans, sport utility vehicles, motorcycles, scooters, boats, personal watercraft, and aircraft.

In some cases, a vehicle includes one or more engines. The term "engine" as used throughout the specification and claims refers to any device or machine that is capable of converting energy. In some cases, potential energy is converted to kinetic energy. For example, energy conversion can include a situation where the chemical potential energy of a fuel or fuel cell is converted into rotational kinetic energy or where electrical potential energy is converted into rotational kinetic energy. Engines can also include provisions for converting kinetic energy into potential energy. For example, some engines include regenerative braking systems where kinetic energy from a drive train is converted into potential energy. Engines can also include devices that convert solar or nuclear energy into another form of energy. Some examples of engines include, but are not limited to internal combustion engines, electric motors, solar energy converters, turbines, nuclear power plants, and hybrid systems that combine two or more different types of energy conversion processes.

For purposes of clarity, only some components of vehicle 100 are shown in the current embodiment. Furthermore, it will be understood that in other embodiments some of the components may be optional. Additionally, it will be understood that in other embodiments, any other arrangements of the components illustrated here can be used for powering the vehicle 100.

Generally, the vehicle 100 may be propelled by any power source. In some embodiments, the vehicle 100 may be configured as a hybrid vehicle that uses two or more power sources. In other embodiments, the vehicle 100 may use a single power source, such as an engine.

In one embodiment, the vehicle 100 includes an engine 501. The engine 501 may include any number of combustion chambers (typically called cylinders). In some cases, the engine 501 can include six cylinders. In other cases, engine 501 includes three cylinders, four cylinders or eight cylinders.

In some embodiments, the vehicle 100 may include provisions for communicating, and in some cases controlling, the various components associated with the engine 501 and/or other systems of the vehicle 100. In some embodiments, the vehicle 100 may include a computer or similar device. In the current embodiment, the vehicle 100 may include the ECU 108. In one embodiment, the ECU 108 may communicate with, and/or control, various components of the vehicle 100.

The ECU 108 may include a microprocessor, random-access memory (RAM), read-only memory (ROM), and software all serving to monitor and supervise various attributes of the occupant, as well as other components or systems of the vehicle 100. For example, the ECU 108 is capable of receiving signals from numerous sensors, devices, and systems located in the vehicle 100. The output of various devices is sent to the ECU 108 where the device signals may be stored in an electronic storage, such as RAM. Both current and electronically stored signals may be processed by a central processing unit (CPU) in accordance with instructions stored in an electronic memory, such as ROM.

The ECU 108 may include object detection software for detecting attributes of the occupants. The ECU 108 may process image data using one or more object detection methods, such as Convolution Neural Networks (CNNs) and their progeny such as Region-based Convolutional Neural Networks (R-CNN). Other example object detection methods may implement a sample-based approach that may learn a statistical mapping between face images with sunglasses and their counterparts without sunglasses. Another example method includes You Only Look Once (YOLO), which may be implemented with a single neural network that predicts bounding boxes and class probabilities, for example where the classes are the attributes of interest, directly from full images in one evaluation.

Figure 6:
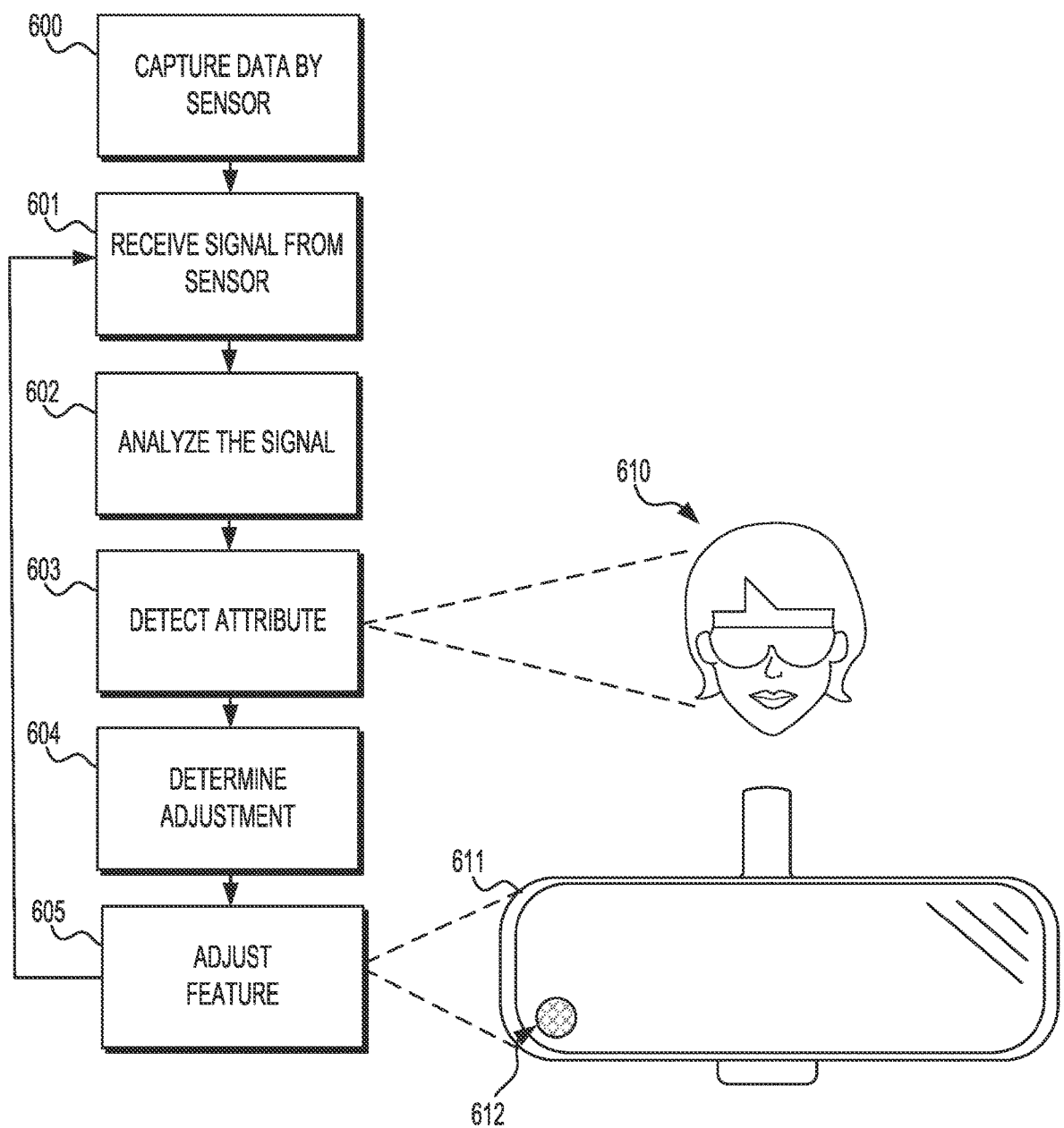
FIG. 6 illustrates an embodiment of a method of adjusting a feature of a vehicle.

In the particular example of YOLO based object detection, an analysis of a signal (for example, at step 602 of FIG. 6) received from a camera or other sensor can include dividing the image into a grid of regions, then, if the center of an object or attribute is in one of these regions, the region in question is made responsible for detecting the object or attribute (for example, at step 603, of FIG. 6). Each of the regions in the grid is responsible for predicting bounding boxes all containing an object as well as a score representing a level of confidence for the object present in the bounding box. If there are no objects in the region, this score is zero. Otherwise, if an object is in the region, the score will be equal to the intersection over union between the predicted bounding box and a ground truth of the image.

Other object detection methods may measure the height of an occupant for example by measuring the occupant given a distance of the occupant from the camera and known dimensions of a reference object, such as the head rest of the seat. The dimensions of other objects may be similarly determined, such as a height of a hat.

Still other detection methods may detect color, such as eye color. Color detection methods may localize an object, such as an eye or iris, and apply a color filter to determine a dominant color of the eye.

The ECU 108 may include a number of ports that facilitate the input and output of information and power. The term "port" as used throughout this detailed description and in the claims refers to any interface or shared boundary between two conductors. In some cases, ports can facilitate the insertion and removal of conductors. Examples of these types of ports include mechanical connectors. In other cases, ports are interfaces that generally do not provide easy insertion or removal. Examples of these types of ports include soldering or electron traces on circuit boards.

All of the following ports and provisions associated with the ECU 108 are optional. Some embodiments may include a given port or provision, while others may exclude it. The following description discloses many of the possible ports and provisions that can be used, however, not every port or provision must be used or included in a given embodiment.

In some embodiments, the ECU 108 can include provisions for communicating and/or controlling various systems associated with engine 501. In some embodiments, ECU 108 can include provisions for receiving various kinds of optical information. In one embodiment, ECU 108 can include a first port 502 for receiving information from one or more optical sensing devices, such as optical sensing device 503. The optical sensing device 503 could be any kind of optical device including a digital camera, video camera, infrared sensor, laser sensor, as well as any other device capable of detecting optical information. In one embodiment, optical sensing device 503 could be a video camera. In addition, in some cases, the ECU 108 could include a second port 504 for communicating with thermal sensing device 505. Thermal sensing device 505 may be configured to detect thermal information. Thermal information may be used to detect attributes of the occupant in conditions where the optical sensing device 503 may have difficulty resolving attributes, such as in low light conditions or in the case of glare from direct sunlight. In some cases, thermal sensing device 505 and optical sensing device 503 could be combined into a single sensor.

Generally, one or more optical sensing devices and/or thermal sensing devices could be associated with any portion of a vehicle. In some cases, an optical sensing device could be mounted to the roof of a vehicle cabin. In other cases, an optical sensing device could be mounted in a vehicle dashboard. Moreover, in some cases, multiple optical sensing devices could be installed inside a vehicle to provide viewpoints of a driver or occupant from multiple different angles. In one embodiment, optical sensing device 503 may be installed in a portion of vehicle 100 so that optical sensing device 503 can capture images of the face and/or head of a driver or occupant. Similarly, thermal sensing device 505 could be located in any portion of vehicle 100 including a dashboard, roof or in any other portion. Thermal sensing device 505 may also be located so as to provide a view of the face and/or head of a driver or occupant.

In some embodiments, the ECU 108 can include provisions for receiving information about pressure points on a seat 506. For example, the ECU 108 could receive information related to the posture of a driver. In one embodiment, the ECU 108 may include a third port 507 for receiving information about the pressure points from pressure sensors 508.

In some embodiments, the ECU 108 can include provisions for communicating with and/or controlling various visual devices 509. The visual devices 509 include any device capable of displaying information in a visual manner. These devices can include lights (such as dashboard lights, cabin lights, etc.), visual indicators, video screens (such as a navigation screen or touch screen), as well as any other visual devices. In one embodiment, ECU 108 includes a fourth port 510 for communicating with the visual devices 509.

In some embodiments, ECU 108 can include provisions for communicating with and/or controlling various audio devices 511. The audio devices 511 include any device capable of providing information in an audible manner. These devices can include speakers as well as any of the systems associated with speakers such as radios, DVD players, CD players, cassette players, MP3 players, navigation systems as well as any other systems that provide audio information. In one embodiment, ECU 108 can include a fifth port 512 for communicating with audio devices 511. Moreover, the audio devices 511 could be speakers in some cases, while in other cases the audio devices 511 could include any systems that are capable of providing audio information to speakers that can be heard by a driver.

In some embodiments, ECU 108 can include provisions for communicating with and/or controlling various tactile devices 513. The tactile devices 513 include any device capable of delivering tactile stimulation to a driver or occupant. For example, the tactile device 513 can include any device that vibrates or otherwise moves in a manner that can be sensed by a driver. The tactile devices 513 could be disposed in any portion of a vehicle. In some cases, a tactile device could be located in a steering wheel to provide tactile feedback to a driver. In other cases, a tactile device could be located in a vehicle seat, to provide tactile feedback or to help relax a driver. In one embodiment, ECU 108 can include fifth port 514 for communicating and/or controlling the tactile devices 513.

In some embodiments, ECU 108 may include provisions for receiving input from a user. For example, in some embodiments, ECU 108 can include a user input device 515 and a sixth port 516 for receiving information from the user input device 515. In some cases, the user input device 515 could comprise one or more buttons, switches, a touch screen, touch pad, dial, pointer, or any other type of input device. For example, in one embodiment, the user input device 515 could be a keyboard or keypad. In another embodiment, the user input device 515 could be a touch screen. In one embodiment, the user input device 515 could be an ON/OFF switch. In some cases, the user input device 515 could be used to turn on or off any devices associated with monitoring the attributes of the vehicle driver or occupant. For example, in an embodiment where an optical sensor is used to detect attribute information, the user input device 515 could be used to switch this type of monitoring on or off. In embodiments using multiple monitoring devices, the user input device 515 could be used to simultaneously turn on or off all the different types of monitoring associated with these monitoring devices. In other embodiments, the user input device 515 could be used to selectively turn on or off some monitoring devices but not others. In at least one example, the user input device 515 can be used to respond to a prompt for confirmation output by the ECU 108, for example, to confirm a change in seat position based on a detection of a hat on the driver's head.

It will be understood that only some components of the vehicle 100 are shown in the current embodiment. In other embodiments, additional components could be included, while some of the components shown here could be optional. Moreover, the ECU 108 could include additional ports for communicating with various other systems, sensors, or components of the vehicle 100. As an example, the ECU 108 could be in electrical communication with various systems for detecting various operating parameters of vehicle 100 and attributes of the occupants. In some embodiments, the ECU 108 can include provisions for communicating with and/or controlling various different vehicle systems. Vehicle systems include any automatic or manual systems that may be used to detect attributes of the occupants. In one embodiment, ECU 108 can include a seventh port 518 for communicating with and/or controlling vehicle systems 110. For purposes of illustration, a single port is shown in the current embodiment for communicating with vehicle systems 110. However, it will be understood that in some embodiments, more than one port can be used. For example, in some cases, a separate port may be used for communicating with each separate vehicle system of vehicle systems 110. Moreover, in embodiments where ECU 108 comprises part of the vehicle system, ECU 108 can include additional ports for communicating with and/or controlling various different components or devices of a vehicle system.

According to some embodiments and referring to FIG. 6, one or more sensors capture data about a person of interest at step 600, and the ECU 108 receives one or more signals about the data from the one or more of the sensors at step 601. The ECU 108 analyzes the one or more signals at step 602, detects one or more attributes of the person of interest at step 603, determines an adjustment of a feature based on the attribute detected at step 604, and adjusts a feature of the vehicle in response to the one or more attributes detected at step 605. For example, in a case where the attribute is a pair of sunglasses 610 worn by a driver of the vehicle, the ECU 108 may automatically turn OFF an auto-dimming feature of a rear-view mirror 611 as indicated by the illumination of a light 612. According to some examples, the ECU 108 continues to monitor for changes in the attributes by returning to step 601. Thus, for example, in the case that the driver removes the sunglasses, the auto-dimming feature can be turned ON at step 605.

In some embodiments, the adjustment at step 604 may be a binary selection. For example, is the feature associated with the attribute ON or OFF. In another case, the adjustment at step 604 may be a function of the associated attribute. For example, the opacity of an electrochromic window film may be a function of a level of tint of detected sunglasses. Further still, the adjustment at step 604 may be a function of the detection of a number of attributes. For example, the system may detect at step 603 that the driver has a small stature and is wearing a tall hat, and based on the combination of these attributes, adjusts a seat height to a medium height setting. In a case that the driver removes the tall hat, the seat height may be adjusted to a higher setting.

Figure 7:
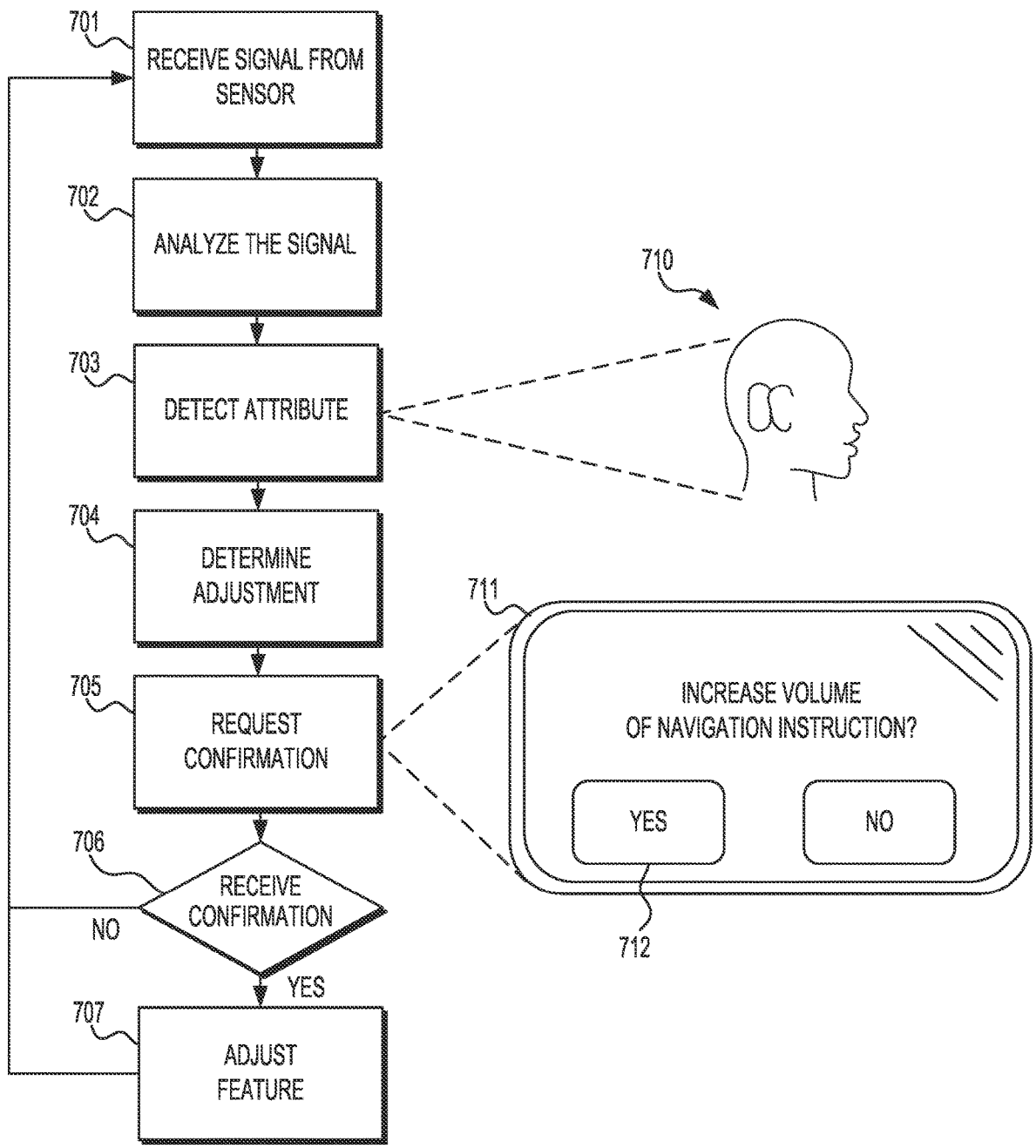
FIG. 7 illustrates an embodiment of a method of adjusting a feature of a vehicle.

According to some embodiments and referring to FIG. 7, the ECU 108 receives one or more signals from one or more of the sensors at step 701, analyzes the one or more signal at step 702, detects one or more attributes of a person of interest at step 703, determines an adjustment of a feature based on the attribute detected at step 704, outputs a signal to the user input device 515 or the vehicle systems 110 causing the output of a confirmation request to the occupant at step 705, wherein the ECU 108 can received a confirmation from the occupant at step 706, which enables the adjustment of the feature of the vehicle at step 707. For example, in a case where the attribute is an audio device worn by the occupant 710, such as a hearing aid device or headphones, the vehicle may request confirmation that a volume of navigation instruction/guidance can be increased as illustrated by user interface 711 of the vehicle, which includes a button 712 to confirm the adjustment. In a case where the confirmation is not received or is denied at step 706, the ECU 108 continues to monitor for changes by returning to step 701. Similarly, in a case where the adjustment is made at step 706, the ECU 108 continues to monitor for changes by returning to step 701.

Figure 8:
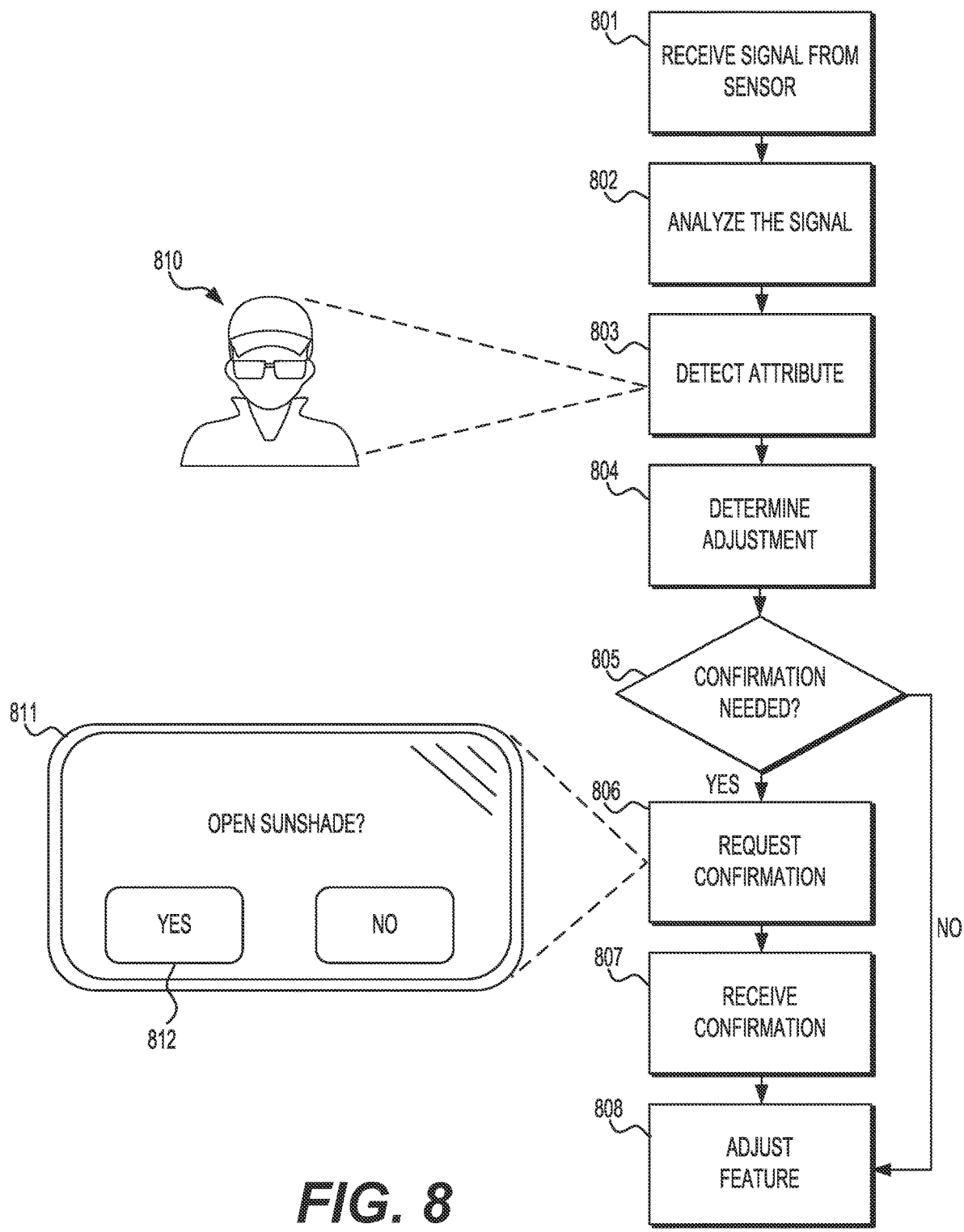
FIG. 8 illustrates an embodiment of a method of adjusting a feature of a vehicle.

According to some embodiments and referring to FIG. 8, the ECU 108 receives one or more signals from one or more of the sensors at step 801, analyzes the one or more signal at step 802, detects one or more attributes of a person of interest at step 803, and determines an adjustment of a feature based on the attribute detected at step 804. The ECU 108 may check with a vehicle profile to determine with the adjustment requires a confirmation at step 805, and if so, output a signal to the user input device 515 or the vehicle systems 110 causing the output of a confirmation request to the occupant at step 806, wherein the ECU 108 can received a confirmation from the occupant at step 807, which enables the adjustment of the feature of the vehicle at step 808. In the case that no confirmation is needed for the adjustment, the adjustment can be made automatically at step 808. For example, in a case where the attribute is a hat worn by the occupant 810, the vehicle may request confirmation that a sub shade can be opened as illustrated by user interface 811 of the vehicle, which includes a button 812 to confirm the adjustment.

In some embodiments, the detection of an attribute, for example at step 803 may include the detection of more than one attribute, such as a hat and sunglasses. Similarly, the determined adjustment, for example, at step 804, can include more than one adjustment, such as adjusting the position of a sunshade associated with a sunroof and the opacity of a window tint. Stated another way, a single attribute may be associated with the control of one or more vehicle systems. In another example, a single vehicle system may be adjusted based on a single attribute, or a combination of multiple attributes present at the same time. Further, a single attribute may be detected based on multiple signals. For example, the posture of the driver may be detected using a combination of pressure sensors in the seat and images captured by a camera, such that a confidence of the detection can be increased.

Figure 9:
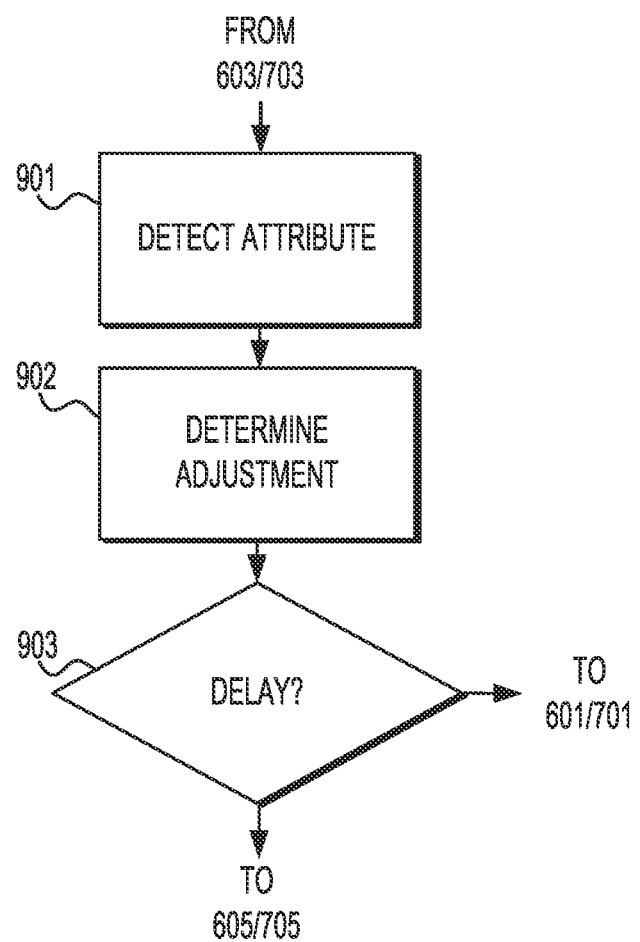
FIG. 9 illustrates an embodiment of a method of delaying an adjustment of a feature of a vehicle.

According to one embodiment, the determination of the adjustment at step 704 may include a delay function. For example, referring to FIG. 9, upon detecting an attribute at step 901, and the determination of the adjustment at step 902, the ECU 108 may delay an adjustment or a request for confirmation for a certain amount of time at step 903. In some cases, an adjustment of a feature may be delayed where an occupant previously declined an adjustment of the feature. In another case, the adjustment of a feature may be delayed where the feature ware previously adjusted automatically. The amount of time may be predetermined, or user selected. In one example, the delay may be a time, such as 10 minutes, or an event, such as one trip.

Figure 10:
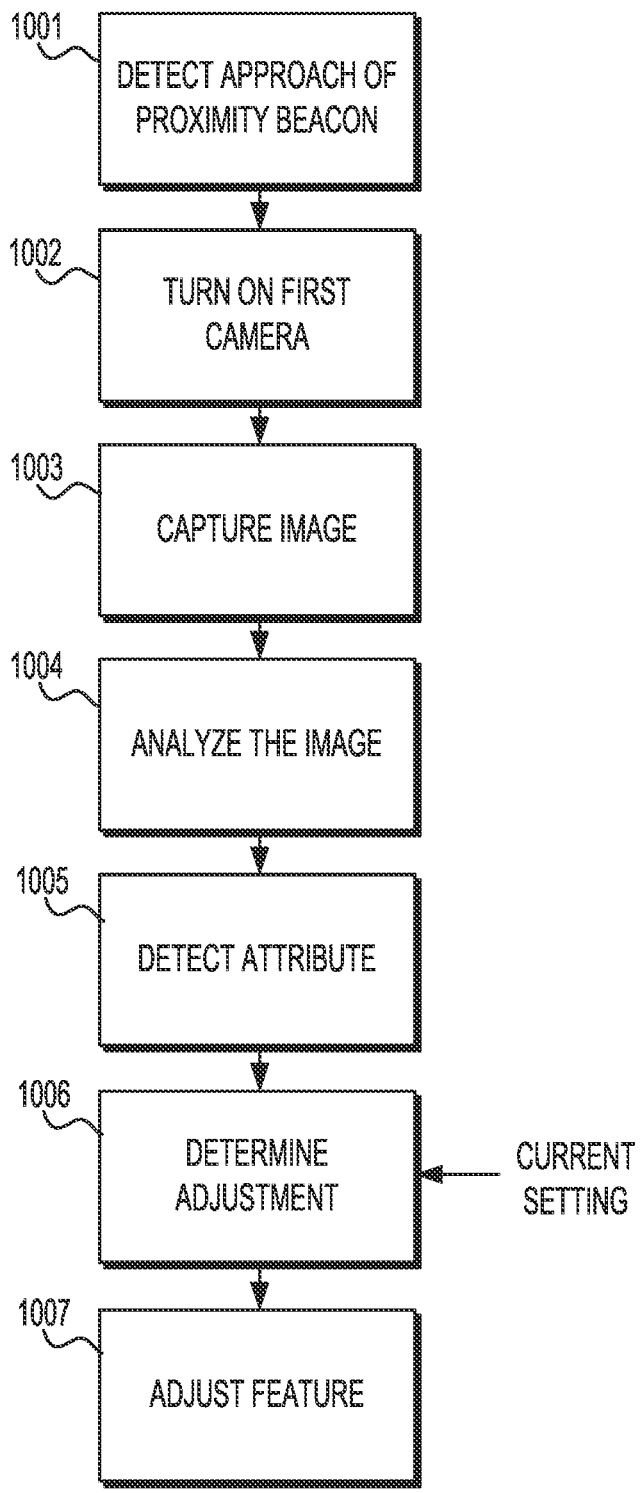
FIG. 10 illustrates an embodiment of a method of adjusting a feature of a vehicle.

In some embodiments, the detection of the attribute can be made before or while the driver enters the vehicle. For example, as illustrated in FIG. 10, the vehicle may detect an approach of a proximity beacon at step 1001, such as a key fob, and enable an external camera at step 1002 to capture an image of the driver at step 1003. The ECU 108 may analyze the image at step 1004, detect an attribute of interest at step 1005, determine an adjustment at step 1006, and adjust a feature of the vehicle 1007 before or while the driver enters the vehicle.

According to at least one example, the adjustment determined at step 1006 includes referencing a database (see database 125, FIG. 1) of attributes and associated adjustments to find the adjustment matching the attribute of the occupant. For example, the vehicle may detect at step 1005 that sunglasses worn by a driver have relatively dark lenes, determine at step 1006 an adjustment of a display brightness to level 5 corresponding to the tint of the sunglasses, wherein level 5 is a brightest setting for the display, and set the display brightness to level 5 at step 1007. In a case where the driver changes to another pair of sunglasses, the vehicle may detect at step 1005 that the new sunglasses have a relatively light tint, determine at step 1006 a corresponding adjustment to level 4, which is less bright than level 5, and set the display brightness to level 4 at step 1007. Accordingly, the vehicle may adjust a feature to one or a number of levels according to the detected attribute.

According to some embodiments, the adjustment determined at step 1006 includes referencing a database of attributes and associated adjustments to find the adjustment matching the attribute of the occupant and determining an amount of the adjustment based on a condition of the attribute of the occupant. These attributes and adjustments may be stored as tuples in the vehicle profile stored in the database 125, which may be referenced upon the detection of the attribute.

According to some embodiments, the adjustment determined at step 1006 is made view of a current setting of the feature associated with the attribute. For example, the adjustment may be relative to the current setting. In the case where the current setting matches the adjustment, the step of adjusting the feature can be omitted. That is, the determination at step 1006 may include a comparison of a current setting to a setting of the feature that is associated with the detection of the attribute.

While different attributes and adjustments are illustrated in the drawings, other attributes and adjustments are contemplated. For example, in the case that the ECU 108 detects that a driver is wearing sunglasses, the brightness of interior displays and lighting can be increased. Likewise, the adjustment of the brightness of the interior displays and lighting can be made dynamically when the ECU 108 detects that the sunglasses have been removed. In a case where the ECU 108 detects that a driver is wearing gloves, then a heated steering wheel may be turned on until the driver removes the gloves.

In some embodiments, when a hearing aid device or headphones are detected, the ECU 108 can provide an option to increase a current volume or a default volume of the radio, voice announcements, and/or audio warnings emitted by the vehicle. In yet another case, when the ECU 108 detects children near the vehicle, for example, using an external camera, the volume of an electric vehicle warning sound designed to alert pedestrians can be increased.

In still another example, when the ECU 108 detects that a driver has light or dark eye color, the ECU 108 can adjust an electrochromic film of a window to block more or less sunlight, which may allow for a more comfortable driver view. In some cases, the ECU 108 may detect that the occupant is wearing a hat and adjust a seat of the occupant lower in the vehicle. Similarly, in a case of the attribute being the occupant's stature, a headrest, a seat height, and/or the angle of a head up display can be adjusted. In some examples, the headrest, the seat height, and/or the angle of a head up display can be adjusted to accommodate a driver's current posture. These and other attributes and adjustments are contemplated.

Embodiments of the disclosure may be implemented as systems, methods, and/or computer program products. The computer program products may include a computer-readable storage medium, in which a computer-readable program instruction configured to enable a processor to implement each aspect of the disclosure is carried.

The computer-readable storage medium may be a physical device capable of retaining and storing an instruction used by an instruction execution device. For example, the computer-readable storage medium may be, but not limited to, an electric storage device, a magnetic storage device, an optical storage device, an electromagnetic storage device, a semiconductor storage device, or any appropriate combination thereof. More specific examples (non-exhaustive list) of the computer-readable storage medium include a portable computer disk, a hard disk, a RAM, a ROM, an EPROM (or a flash memory), an SRAM, a Compact Disc Read-Only Memory (CD-ROM), a Digital Video Disk (DVD), a memory stick, a floppy disk, a mechanical encoding device, for example, a punched card or in-slot raised structure with an instruction stored therein, and any appropriate combination thereof. Herein, the computer-readable storage medium is not explained as a transient signal, for example, a radio wave or another freely propagated electromagnetic wave, an electromagnetic wave propagated through a wave guide or another transmission medium (for example, a light pulse propagated through an optical fiber cable) or an electric signal transmitted through an electric wire.

The computer-readable program instruction described here may be downloaded from the computer-readable storage medium to each computing/processing device or downloaded to an external computer or an external storage device through a network such as the Internet, a Local Area Network (LAN), a Wide Area Network (WAN) and/or a wireless network. The network may include a copper transmission cable, optical fiber transmission, wireless transmission, a router, a firewall, a switch, a gateway computer and/or an edge server. A network adapter or network interface in each computing/processing device receives the computer-readable program instruction from the network and forwards the computer-readable program instruction for storage in the computer-readable storage medium in each computing/processing device.

The computer program instruction configured to execute the operations of the disclosure may be an assembly instruction, an Instruction Set Architecture (ISA) instruction, a machine instruction, a machine related instruction, a microcode, a firmware instruction, state setting data or a source code or target code edited by one or any combination of more programming languages, the programming language including an object-oriented programming language such as Smalltalk and C++ and a conventional procedural programming language such as "C" language or a similar programming language. The computer-readable program instruction may be completely executed in a computer of a user or partially executed in the computer of the user, executed as an independent software package, executed partially in the computer of the user and partially in a remote computer, or executed completely in the remote server or a server. Under the condition that the remote computer is involved, the remote computer may be connected to the computer of the user through any type of network including an LAN or a WAN, or may be connected to an external computer (for example, connected by an Internet service provider through the Internet). In some embodiments, an electronic circuit such as a programmable logic circuit, an FPGA, or a Programmable Logic Array (PLA) may be customized by use of state personal information of a computer-readable program instruction, and the electronic circuit may execute the computer-readable program instruction, thereby implementing each aspect of the disclosure.

Herein, each aspect of the disclosure is described with reference to flowcharts and/or block diagrams of the method, device (system) and computer program product according to the embodiments of the disclosure. It is to be understood that each block in the flowcharts and/or the block diagrams and a combination of various blocks in the flowcharts and/or the block diagrams may be implemented by computer-readable program instructions.

These computer-readable program instructions may be provided for a universal computer, a dedicated computer or a processor of another programmable data processing device, thereby generating a machine to further generate a device that realizes a function/action specified in one or more blocks in the flowcharts and/or the block diagrams when the instructions are executed through the computer or the processor of the other programmable data processing device. These computer-readable program instructions may also be stored in a computer-readable storage medium, and through these instructions, the computer, the programmable data processing device and/or another device may work in a specific manner, so that the computer-readable medium including the instructions includes a product including instructions for implementing various aspects of the function/action specified in one or more blocks in the flowcharts and/or the block diagrams.

These computer program instructions can also be loaded to a computer, another programmable data processing device or other devices, so that a series of operating steps are performed on the computer, the another programmable data processing device or other devices to produce a computer-implemented process, and therefore instructions executed on the computer, the another programmable data processing device or other devices may implement the function/action specified in one or more blocks in the flowcharts and/or the block diagrams.

The flowcharts and block diagrams in the drawings illustrate example system architectures, functions and operations of the system, method, and computer program product according to multiple embodiments of the disclosure. Each block in the flowcharts or the block diagrams may represent part of a module, a program segment or an instruction, and part of the module, the program segment or the instruction includes one or more executable instructions configured to realize a specified logical function. In some implementations, the functions marked in the blocks may also be realized in a sequence different from those marked in the drawings. For example, two sequential blocks may actually be executed substantially concurrently and may also be executed in a reverse sequence. It is further to be noted that each block in the block diagrams and/or the flowcharts and a combination of the blocks in the block diagrams and/or the flowcharts may be implemented by a dedicated hardware-based system configured to execute a specified function or operation or may be implemented by a combination of a special hardware and a computer instruction.

While various embodiments of the disclosure have been described, the description is intended to be exemplary, rather than limiting and it will be apparent to those of ordinary skill in the art that many more embodiments and implementations are possible that are within the scope of the disclosure. Accordingly, the disclosure is not to be restricted except in light of the attached claims and their equivalents. Also, various modifications and changes may be made within the scope of the attached claims.

I claim:

1. A method of adjusting a feature of a vehicle comprising:
   receiving an image of an occupant of the vehicle from a camera of the vehicle:
   performing an analysis of the image;
   detecting eye color of the occupant based on the analysis of the image; and
   adjusting an opacity of an electrochromic window film based on the detected eye color of the occupant.

2. A method of adjusting a feature of a vehicle comprising:
   receiving an image of an occupant of the vehicle from a camera of the vehicle;
   performing an analysis of the image;
   detecting the presence of a hearing aid device worn by the occupant based on the analysis of the image; and
   adjusting a volume of an audio output of the vehicle based on the detected presence of the hearing aid device.

3. A method of adjusting a feature of a vehicle comprising:
   receiving an image of an occupant of the vehicle from a camera of the vehicle;
   performing an analysis of the image;

detecting the presence of gloves worn by the occupant based on the analysis of the image; and adjusting a steering wheel heating device of the vehicle based on the detected presence of the gloves.

4. A vehicle comprising:

a camera;

an electronic control unit (ECU) connected to the camera;

a vehicle system connected to the ECU, the vehicle system including an electrochromic window film; and a memory storing an association between an occupant eye color and an associated adjustment to be made to an opacity of the electrochromic window film, the ECU having instructions stored thereon that, when executed, perform the following steps:

receiving an image of an occupant of the vehicle from the camera;

performing an analysis of the image;

detecting an eye color of the occupant in the image received from the camera;

implementing the associated adjustment to the opacity of the electrochromic window film based on the eye color detected in the image.

5. A vehicle comprising:

a camera;

an electronic control unit (ECU) connected to the camera;

a vehicle system connected to the ECU, the vehicle system including an audio output of the vehicle; and a memory storing an association between the presence of a hearing aid device worn by an occupant of the vehicle and an associated adjustment to be made to a volume of the audio output of the vehicle, the ECU having instructions stored thereon that, when executed, perform the following steps:

receiving an image of an occupant of the vehicle from the camera;

performing an analysis of the image;

detecting the presence of a hearing aid device of the occupant in the image received from the camera;

implementing the associated adjustment to the volume of the audio output of the vehicle based on the presence of the hearing aid device detected in the image.

6. A vehicle comprising:

a camera;

an electronic control unit (ECU) connected to the camera;

a vehicle system connected to the ECU, the vehicle system including a steering wheel heating device of the vehicle; and a memory storing an association between the presence of gloves on an occupant of the vehicle and an associated adjustment to be made to the steering wheel heating device, the ECU having instructions stored thereon that, when executed, perform the following steps:

receiving an image of an occupant of the vehicle from the camera;

performing an analysis of the image;

detecting the presence of gloves on the occupant in the image received from the camera;

implementing the associated adjustment to the steering wheel heating device of the vehicle based on the presence of gloves detected in the image.

7. The method of claim 1, further including presenting the occupant of the vehicle with a request for confirmation that they would like the adjustment to the opacity of the electrochromic window film to be performed.

8. The method of claim 2, further including presenting the occupant of the vehicle with a request for confirmation that they would like the adjustment to the volume of the audio output to be performed.

9. The method of claim 3, further including presenting the occupant of the vehicle with a request for confirmation that they would like the adjustment to the steering wheel heating device to be performed.

10. The vehicle of claim 4, wherein the ECU further includes instructions for presenting the occupant of the vehicle with a request for confirmation that they would like the adjustment to the opacity of the electrochromic window film to be performed.

11. The vehicle of claim 5, wherein the ECU further includes instructions for presenting the occupant of the vehicle with a request for confirmation that they would like the adjustment to the volume of the audio output to be performed.

12. The vehicle of claim 6, wherein the ECU further includes instructions for presenting the occupant of the vehicle with a request for confirmation that they would like the adjustment to the steering wheel heating device to be performed.

* * * * *